Oct. 9, 1962  F. I. ALEXANDER ETAL  3,057,197
METHOD AND APPARATUS FOR DETERMINING WELL
PIPE STUCK POINT LOCATION
Filed May 11, 1959
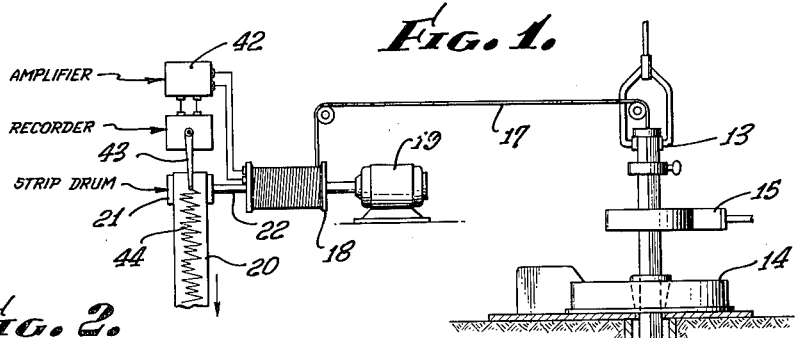
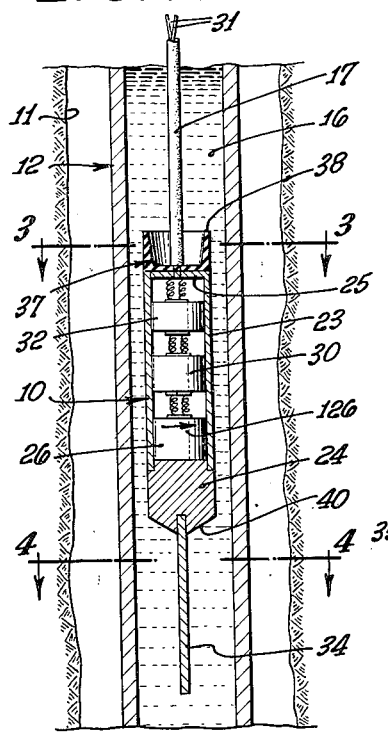
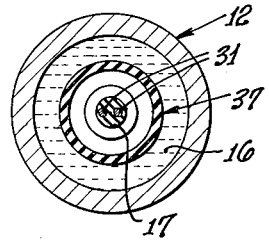
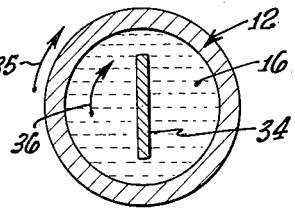
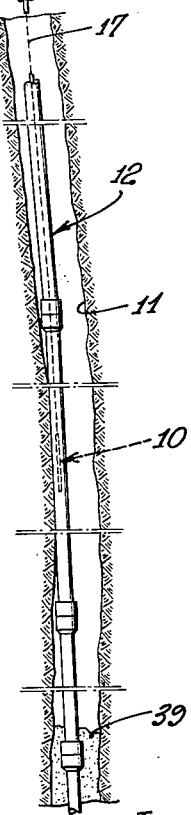
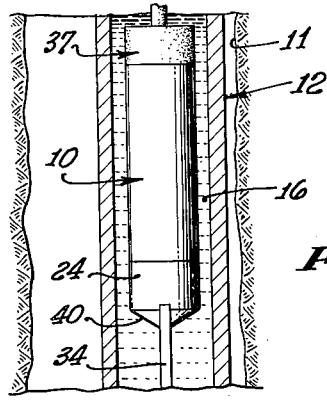
INVENTORS.
FORD I. ALEXANDER
IRA C. BECHTOLD
BY White & Haefliger
ATTORNEYS.

United States Patent Office 3,057,197
Patented Oct. 9, 1962

3,057,197
METHOD AND APPARATUS FOR DETERMINING WELL PIPE STUCK POINT LOCATION
Ford I. Alexander, Arcadia, and Ira C. Bechtold, La Habra, Calif.; said Bechtold assignor to said Alexander
Filed May 11, 1959, Ser. No. 812,178
12 Claims. (Cl. 73—151)

This invention relates generally to the determination of the depth or depths at which pipe is movable in a well relative to the surrounding formation. More particularly, the invention concerns a novel method and apparatus for determining at what depth pipe is stuck or immovable in a well, in order that the pipe sections above the stuck point location may be recovered through the use of suitable recovery apparatus.

In well drilling, it frequently happens that the drill string may become stuck at locations that may range from depths near the bit to intermediate depths many pipe stand lengths above the bit, depending upon conditions encountered in a particular well being drilled and the particular reason for the pipe becoming lodged. To illustrate, the pipe may become stuck as a result of a cave-in, wedging by loose objects in the well, or by key seating of pipe in crooked holes. Also, well casing may become stuck in the hole.

In keeping with one of the presently prevailing practices, the determination of the stuck point location is made by attaching a strain sensitive device in the nature of a strain gauge to spaced apart portions of the pipe in the well. When the pipe is thereafter strained, the strain sensitive apparatus will register strain at locations above the stuck point, but will fail to register strain if the apparatus is attached to the pipe below the stuck point, thereby determining the stuck point location. The process of taking the strain readings is made lengthy and time consuming by the necessity of attaching the apparatus to the pipe at different elevations, and therefore the determination of the stuck point location by presently known apparatus is expensive and not as efficient as desirable.

The present invention has for its general object to provide a method and apparatus whereby the stuck point location may be rapidly determined by detecting accelerated pipe movement at determinable depths in the well, such detection being possible without requiring attachment of the detector to the pipe. As a direct result, continuous readings or determinations of pipe acceleration are possible as the detector is lowered or elevated in the pipe, and in general at locations above the stuck point accelerated pipe movement will be detectable, whereas no such accelerated movement of the pipe will occur below the stuck point and therefore will not be discernible by the apparatus to be described.

Speaking first with regard to the method broadly contemplated for determining at what depths pipe is movable in a well relative to the surrounding formation, the invention contemplates displacement of the pipe at the well head to transmit accelerating movement to the pipe within the well, together with detection of accelerated pipe movement at determinable depths in the well. Any such detected accelerated pipe movement is then made known at the well head by the transmission thereto of signals produced as a result of pipe acceleration detection. Furthermore, the method contemplates broadly the transmission of accelerating movement to the pipe and to fluid therein within the well, and the detection of accelerated movement of the fluid at determinable depths in the well.

More particularly, the methods to be followed or taught in the use or practice of the invention include the suspending of the acceleration detector in the fluid at determinable depths within the pipe, and displacement of the pipe at the well head, as by rotating or vertically lifting the pipe, to transmit accelerating movement to the pipe and to the fluid therein within the well. Such fluid may typically comprise viscous drilling mud, and will weigh up to 100 pounds per cubic foot, so that the fluid pressure will range up to several thousand pounds per square inch at considerable depths. Accordingly, when the pipe is subjected to rotary acceleration, the fluid will move with the pipe and transmit pipe acceleration to the detector suspended in the fluid.

Such pipe displacement may be carried out continuously as the detector is elevated or lowered in the fluid within the pipe at determinable depths so that a log of pipe acceleration at known depths may be obtained, as for example on a strip chart at the surface. In this manner, a complete survey of the capacity of the pipe to accelerate at known depths may be obtained very rapidly. Therefore, when the survey shows that below a particular depth the pipe no longer has a capacity to accelerate, it is assured that the pipe has become stuck at the point below which it no longer transmits acceleration to the detector.

The invention is also concerned with novel apparatus for determining at what depths pipe is movable in a well relative to the surrounding formation. Such apparatus comprises broadly means including an acceleration detector operable to produce a signal related to or in response to accelerating movement of the detector, and means for suspending the detector at determinable depths within the well pipe so as to be accelerated in response to pipe displacement at the well head effective to produce accelerating pipe movement near the detector. More particularly, the means for suspending the detector includes an upright carrier body supporting the detector and adapted to be elevated and lowered within the well pipe as by means of a line or cable extending to the surface. In order that the carrier body may accelerate with the pipe and fluid therein, means are provided to be carried by the body for coupling it to the fluid in the pipe, such coupling means typically have a surface extending in a substantially vertical plane so as to be rotated by the fluid in response to accelerated rotation of the pipe and fluid. The coupling means also may have a surface extending in a substantially horizontal plane so as to resist vertical displacement of the carrier body relative to fluid in the pipe, as will be explained.

It is contemplated that the detector will be operable to produce an electrical signal, and therefore different types of detectors may be used so long as they will produce an electrical signal related to acceleration, which includes changes in velocity and changes in amplitude of motion at the detector location. Since the acceleration to be detected may be slight, a signal amplifier is preferably included within the carrier body so as to be suspended therewith within the well pipe, and a transmission line is connected in series with the amplifier for transmitting the amplified signal to the well head. Also, the energy source for the amplifier is desirably carried in association therewith in the well, thereby obviating difficulties arising from transmitting power from the well head to the amplifier deep in the hole. As previously described, means may be provided at the well head for continuously recording the signals produced by the acceleration detector as it is lowered or elevated in the pipe. The acceleration detector may also have selected directional orientation in the carrier to respond maximally to contemplated directional acceleration of the pipe in the well, as will be described.

These and other objects and advantages of the present invention, as well as the details of an illustrative embodiment will be more fully understood from the following detailed description of the drawings, in which:

FIG. 1 is a general view showing the acceleration detector run down in a well for detection of pipe acceleration;

FIG. 2 is an enlarged view showing the interior construction of the detection instrument and carrier body thereof;

FIG. 3 is a section taken on line 3—3 of FIG. 2;

FIG. 4 is a section taken on line 4—4 of FIG. 2;

FIG. 5 is a view showing the carrier body exterior in a well pipe that has been displaced by lateral pipe acceleration toward one side of the well hole.

Referring first to the general showing of FIG. 1, the carrier body for the detector is shown generally at 10 run down into the well open hole 11 within a standard drill pipe string 12 suspended by a conventionally illustrated elevator 13. The surface equipment is shown to include also a rotary table 14 and tongs 15 either or both of which may be used in rotating and torsionally winding the drill string with acceleration, as and for the purposes later described. Likewise, the elevator 13 may be used in lifting and lowering the drill string with acceleration to transmit accelerating displacement to the drill string in the hole.

The carrier body 10 is suspended in the drill string, and typically within fluid contained therein as indicated at 16 in FIG. 2, by means of a line or a cable 17 which may be raised or lowered by means of a drum 18 on which the cable is wound. The drum is rotated typically by means of a reversible motor or power unit 19, and readings as to the depth of the carrier body 10 in the hole are obtainable off a chart 20 driven in synchronism with the drum 18 through a strip drum 21 on which the chart 20 is wound and to which the drum 18 is connected as by shaft 22. Broadly speaking, the invention contemplates the use of any means for recording the carrier depth and for synchronizing the record drive with the travel of the carrier 10 in the well.

Turning to FIGS. 2 through 4, the carrier body is shown typically to comprise a tubular housing 23 the lower end of which is closed by means of a weight 24, and the upper end of which is closed at 25. Within the interior of the housing 23 is located an acceleration detector 26 operable to produce an electrical signal related to accelerating movement of the detector. Types of accelerometers which may be used include the unbonded strain gauge variety having low output impedance, the magnetostrictive type, also having low output impedance and the electrokinetic type which in common with the piezoelectric crystal type has high output impedance. By piezoelectric material we mean any substance capable of producing piezoelectricity in response to applied force. A conventional piezoelectric accelerometer has an inertia means mounted on the electrode faces of the piezoelectric element whereby a force proportional to acceleration may be applied to the element to generate a voltage. Typically, the transducer or accelerometer is oriented so that the force lies in the direction of the thickness of the transducer element. The barium titanate piezoelectric accelerometer is desirable from the standpoint of its high temperature capacity or capability, it being known that high temperatures are encountered within the well fluid at great depths.

Reference to FIG. 2 will show a transverse arrow 126 on the detector 26, indicating that the latter is of the directionally oriented type and is oriented to respond maximally to acceleration in the transverse directional mode indicated by the arrow. Thus changes in pipe motion or velocity, or acceleration, having transverse directional components in the general direction of arrow 126 and communicated to the carrier 10 will cause the detector to respond maximally in terms of signal production. A typical directionally oriented acceleration detector is that identified as model 2242 in a brochure published by Endevco Corporation of Pasadena, California. It is contemplated that a detector may be used having maximal response in a rotary direction, for example about the vertical axis of the carrier 10.

The signal produced by the accelerometer or acceleration detector is then fed to an amplifier shown generally at 30 in FIG. 2 the output of which is coupled to the electrical transmission line 31 within cable 17 through an impedance matching device indicated at 32. For example, the transmission line 31 may have a relatively low impedance, whereas the output impedance of the amplifier may be much higher, so that impedance matching becomes necessary as by means of a known impedance matching device 32. Associated with the amplifier and also designated by the number 30 is the energy source or power supply for the amplifier, such as batteries. It is contemplated that a transistor amplifier 30 is most desirable in view of savings in space and low power requirements, such an amplifier usually being considered to have relatively low input impedance and high output impedance. Useful transistor amplifiers are shown in a bulletin published by Texas Instruments Incorporated and entitled "Negative Feed Back Technique Furnishes High Input Impedance in Silicon Transistor Amplifier," volume 1, No. 4, January 1959. Other types of amplifiers may of course be used.

As mentioned in the introduction, means are provided for coupling the carrier body to the fluid 16 within the pipe 12 so that acceleration of the fluid, which typically comprises highly viscous drilling mud, may be transmitted to the carrier body and the acceleration detector 26. Such a means is shown in FIGS. 2 and 4 in the form of a flat vertically elongated plate 34 integral with and extending downwardly from the weight 24. As shown in FIG. 4, rotative acceleration of the pipe 12 in the direction of arrow 35 will be transmitted to the fluid 16 to rotate it with acceleration in the direction of arrow 36, and such fluid acceleration will be picked up by the plate 34, the latter rotating with acceleration in conjunction with the fluid and serving to transmit rotation to the detector 26 through the carrier. Attached to the top of the carrier body 10 is an upwardly opening receptacle 37 having a flexible annular lip 38. The receptacle or cup 37 acts to couple the carrier body to fluid 16 in the pipe 12 so that if the carrier body is below the stuck point as indicated by the cave-in 39 in FIG. 1, no appreciable acceleration will be imparted to the carrier body even though the cable 17 contacts and is moved vertically by the pipe 12 at an upper location during vertical acceleration of the pipe produced by lifting and lowering thereof. The lower tapered surface 40 of the weight 24 also acts to couple the carrier body to the fluid 16, for the same purpose.

FIG. 5 shows the carrier body 10 displaced laterally in the hole 11 with the pipe 12 and the fluid 16 therein as a result of vertical elevation or lowering of the pipe string in the hole. For example, if when the pipe is let down in the hole it assumes the position shown in FIG. 2, then it will be observed that the pipe will shift toward one side of the hole as seen in FIG. 5 upon lifting of the drill string as by use of the elevator 13 where the hole is crooked as seen in FIG. 1. Since generally well holes are in fact crooked, such lifting and lowering of the drill string will produce lateral shifting and acceleration of the pipe, with resultant detection of the acceleration by the detector 26, and concomitant signal production.

The signal transmitted back to the ground surface through the cable 17 may then be subjected to further amplification as by the amplifier 42. The amplified signal may then be recorded as by movement of a stylus 43 producing a record 44 on the chart 20 as the latter is driven by the motor 19. Thus, the presence of pipe acceleration at known depth in the well may be instantly determined by visual inspection of the chart 20 and the record 44 produced thereon. Furthermore, a rapid survey of the movability of the pipe at known depths in the hole may be accomplished merely by lowering the carrier body 10 in the pipe and displacing the pipe at the well head to transmit accelerating movement to the pipe within the well, such displacement being either rotative or vertical as by lifting and lowering the pipe. Recordings 44 will then be made on the chart 20 to indicate the depths at which pipe is accelerated, and when the point is reached below which the pipe no longer accelerates, it is assured that the stuck point location has been found.

The invention also contemplates the use of separate instrumentation at the well head for simultaneously indicating the depth of a movement or acceleration of the detector in the well and the presence or absence of pipe movement or acceleration at the depth location of the detector, through utilization of the signal derived from the detector.

We claim:

1. In the method of determining at what depth pipe is movable in a well relative to the surrounding formation and above a location at which the pipe is stuck in the well, the pipe containing fluid which extends in the pipe to a point higher than the stuck location, said method including suspending a fluid acceleration detector to hang in said contained fluid and free of attachment to the pipe, displacing the pipe at the well head thereby to displace the portion of the pipe above the stuck location and to accelerate pipe contained fluid which is higher than said stuck location, and detecting said fluid acceleration by operation of said suspended detector while the detector remains free of attachment to the pipe.

2. In the method of determining at what depth pipe is movable in a well relative to the surrounding formation and above a location at which the pipe is stuck in the well, the pipe containing liquid which extends in the pipe to a point higher than the stuck location, said method including suspending a liquid acceleration detector to hang in the pipe surrounded by said contained liquid and free of attachment to the pipe, vertically displacing the pipe at the well head thereby to displace transversely the portion of the pipe above the stuck location and to accelerate transversely the pipe contained liquid which is higher than said stuck location, and detecting said liquid acceleration by operation of said suspended detector while the detector remains free of attachment to the pipe.

3. In the method of determining at what depth pipe is movable in a well relative to the surrounding formation and above a location at which the pipe is stuck in the well, the pipe containing liquid which extends in the pipe to a point higher than the stuck location, said method including suspending a liquid acceleration detector to hang in the pipe surrounded by said contained liquid and free of attachment to the pipe, rotating the pipe at the well head thereby to rotate the portion of the pipe above the struck location and to accelerate pipe contained liquid which is higher than said stuck location, and detecting said liquid acceleration by operation of said suspended detector while the detector remains free of attachment to the pipe.

4. The method of claim 1 in which said fluid comprises viscous mud.

5. The method of claim 4 in which said detection step includes generating an electrical signal, and including the further steps of amplifying said signal and transmitting to the well surface the amplified signal.

6. Apparatus of the character described, including a string of pipe extending within a well between a surface location and an underground location at which the pipe is stuck, said surface and underground locations being vertically staggered, the pipe containing fluid which extends in the pipe to a point higher than the stuck location, means at the well surface moving the pipe thereby to displace the portion of the pipe above the stuck location and to accelerate pipe contained fluid which is higher than said stuck location, and detector means suspended in and surrounded by the accelerating fluid and free of attachment to the pipe for fluid induced movement and for producing a signal in response thereto.

7. The invention as defined in claim 6 in which said fluid comprises a viscous mud and said detector means remains surrounded by said mud during said signal production.

8. The invention as defined in claim 7 in which said detector means includes a detector housing, an electrical signal generating detector in said housing, and coupling structure carried on said housing for coupling to fluid in said pipe so that fluid movement induces movement of said detector means.

9. The invention as defined in claim 8 in which said coupling structure has an elongated surface extending lengthwise of the pipe in a substantially flat plane in contact with said fluid.

10. The invention as defined in claim 8 including means for raising and lowering said detector housing in the well pipe, a signal amplifier electrically connected with said detector in said housing, and a line extending in the pipe between the well head and said housing for transmitting the amplified signal to the well head.

11. The invention as defined in claim 10 in which said detector comprises a piezoelectric ceramic having electrodes across which said signal is produced.

12. The invention as defined in claim 10 including a battery source of electrical energy in said housing and electrically connected with said amplifier.

References Cited in the file of this patent

UNITED STATES PATENTS

| | | |
|---|---|---|
| 2,161,256 | Karcher | June 6, 1939 |
| 2,233,992 | Wyckoff | Mar. 4, 1941 |
| 2,436,047 | Martin | Feb. 17, 1948 |
| 2,716,890 | Martin | Sept. 6, 1955 |